(No Model.)  2 Sheets—Sheet 1.
J. F. THOMAS.
SIDE SPRING FOR VEHICLES.
No. 398,008. Patented Feb. 19, 1889.
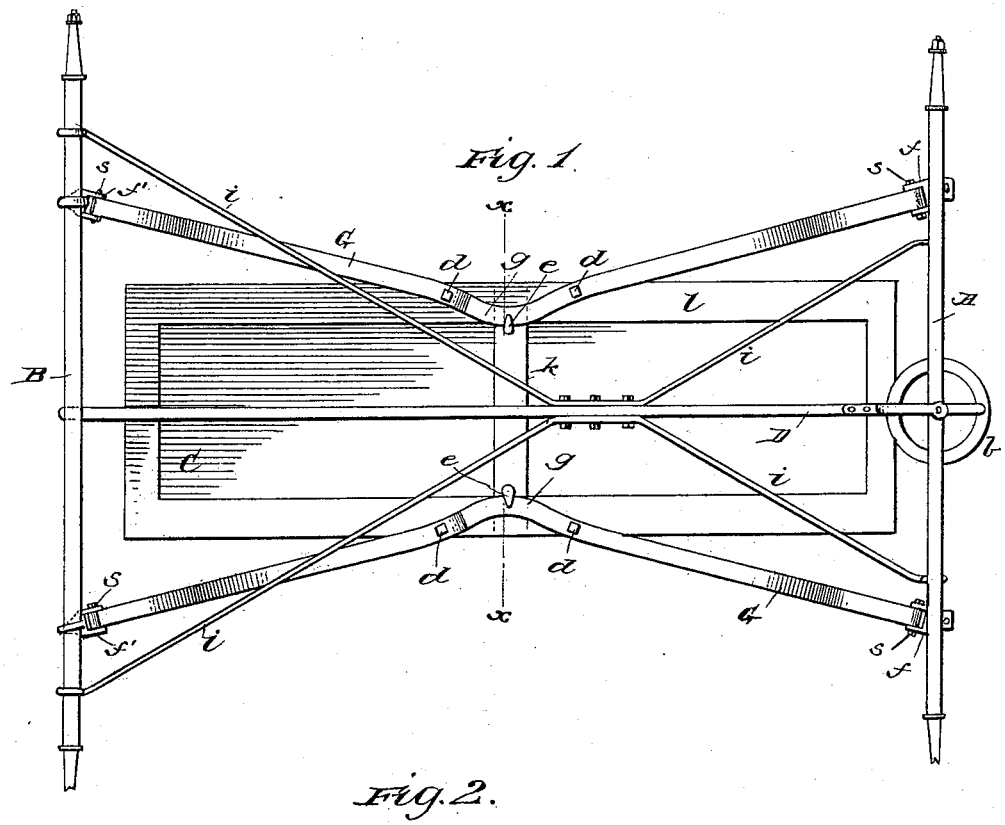
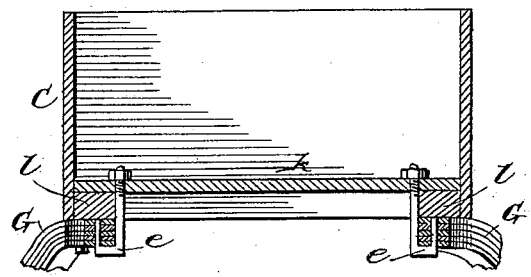
WITNESSES:
W. R. Davis.
C. Sedgwick.
INVENTOR:
J. F. Thomas
BY Munn & Co.
ATTORNEYS.

(No Model.) 2 Sheets—Sheet 2.
J. F. THOMAS.
SIDE SPRING FOR VEHICLES.
No. 398,008. Patented Feb. 19, 1889.
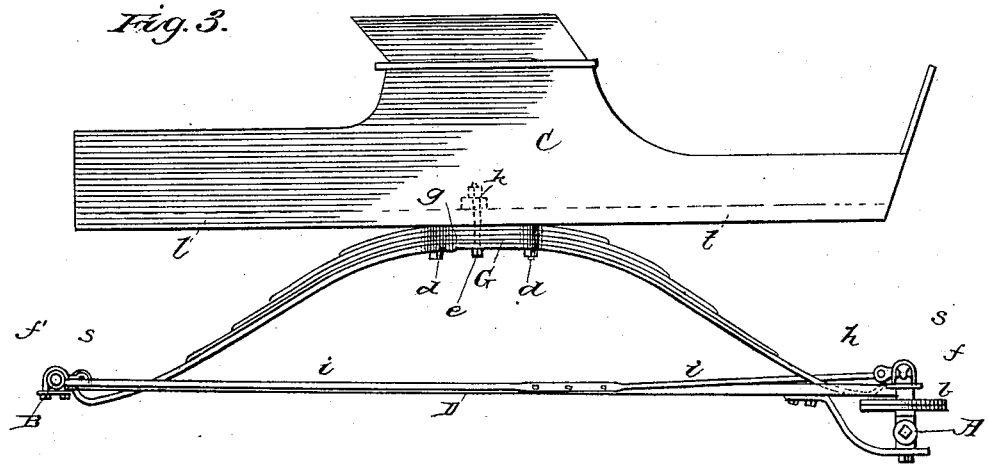
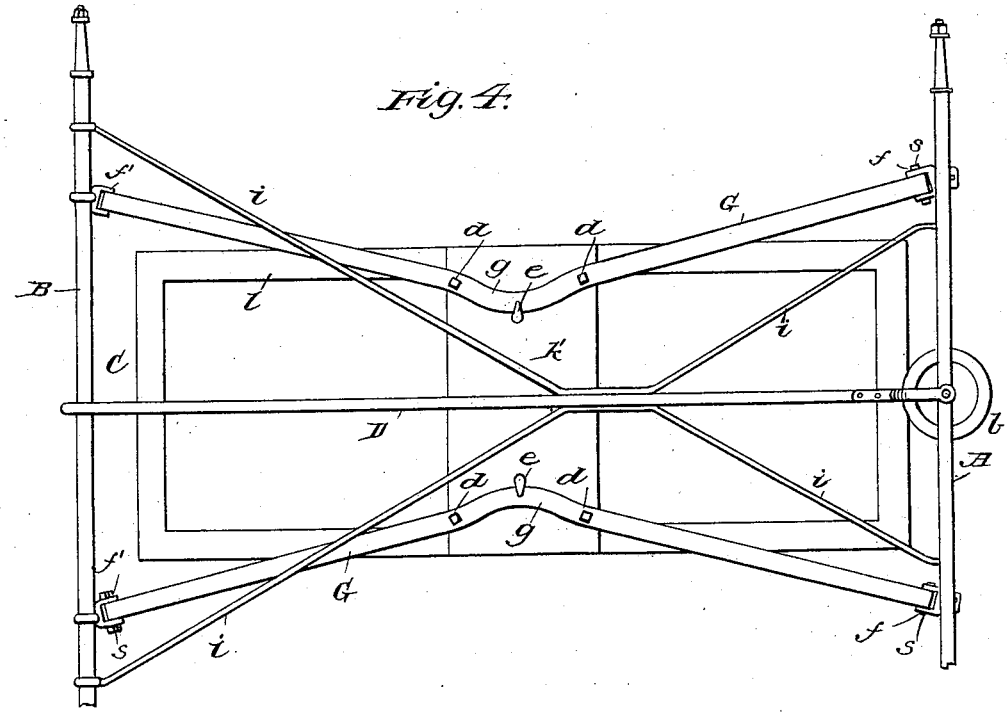
WITNESSES:
N. R. Davis
C. Sedgwick
INVENTOR:
J. F. Thomas
BY Munn & Co
ATTORNEYS.

UNITED STATES PATENT OFFICE.

JAMES F. THOMAS, OF ALEXANDRIA, NEBRASKA.

SIDE SPRING FOR VEHICLES.

SPECIFICATION forming part of Letters Patent No. 398,008, dated February 19, 1889.

Application filed November 3, 1888. Serial No. 289,916. (No model.)

*To all whom it may concern:*

Be it known that I, JAMES F. THOMAS, of Alexandria, in the county of Thayer and State of Nebraska, have invented a new and useful Improvement in Side Springs for Vehicles, of which the following is a full, clear, and exact description.

This invention consists in a certain novel construction of the side springs of wagons and other vehicles, and in a combination of said springs with adjacent parts forming portions of the running-gear of the vehicle, substantially as hereinafter described, and pointed out in the claim.

The invention more particularly relates to a certain description of side springs and combination of the same with the body of the vehicle and its front and rear axles made the subject of another application for patent filed by me on January 23, 1888, Serial No. 261,590, and allowed June 26, 1888, and which consisted in the combination, with the vehicle-body and its front and rear axles, of continuous bowed side springs bent laterally inward at their middle parts and there secured to the vehicle-body or cross-piece thereof, thence diverging in straight lines outward and clipped to the head-block and rear axle; but the invention which is the subject of this specification differs from my other invention in a peculiar bent construction of the bowed side springs at their centers and in the means employed for securing the springs at their central portions to the frame-work of the vehicle, whereby the bowed springs are restrained from torsion at their centers when the load is on and their holding-bolts from being bent and broken.

Reference is to be had to the accompanying drawings, forming a part of this specification, in which similar letters of reference indicate corresponding parts in all the figures.

Figure 1 represents an under view of the body and running-gear, in part, of a narrow-bodied buggy or wagon having my improvement applied; Fig. 2, vertical transverse section of the same, in part, upon the line $x\ x$ in Fig. 1, and Fig. 3 a side view thereof. Fig. 4 is an under view of the body and running-gear, in part, of a wider-bodied buggy or wagon having my improvement applied.

A is the front axle, and B the rear axle, of the vehicle; C, the vehicle-body; D, the reach or pole, and $b$ the usual fifth-wheel.

G G are the side many-leafed springs, preferably of increased thickness in their rear portions, as shown in Fig. 3, to give them additional strength without impairing their elasticity. These springs have their several leaves secured together at their centers and to the frame-work of the body of the vehicle by bolts $d\ d$ and $e$, the latter or central one of which is of peculiar construction and specially applied, as hereinafter described.

To prevent side roll of the buggy or wagon, each of the springs G is made to bow inward or bent laterally in an inward direction toward their center, and from this bent-inward central portion each spring in front and rear thereof diverges laterally in straight lines or courses, and the clips or couplings $f\ f'$, with which the springs connect at their front and rear ends, respectively, are made to form skew-joints or knuckles adapted to conform to the laterally-diverging terminal portions of the springs, and to make the clip-bolts $s$, which establish the connection of the springs with the rear axle, B, and with the cross-bar $h$, that is connected with the front axle, A, cross the straight laterally-diverging portions of the springs at right angles and in proper relation with the centers of the springs and coupling-pole of the vehicle. The cross-bar $h$ of the vehicle is restrained from backward and forward motion by braces $i\ i$, running from near either end of the said bar to the coupling-pole D, thence to the rear axle, and secured by bolts and clips. In such an arrangement of laterally-inwardly bent or bowed side springs there is a tendency, when the load is on, to produce a torsion of the springs at their center which is liable to twist or bend and break the bolts that unite the springs at their center with the body of the vehicle. To avoid this I crook or curve the springs G G laterally at their center or give them what may be termed a "horseshoe" shape, with their convex sides innermost, as shown at $g$, said curves extending from or near the spring-leaf-holding bolts $d\ d$, and I connect such crooked portions $g$ at their centers with the frame-work of the vehicle by hook-shaped bolts $e$, arranged upon the inner or apex side of the curved portions g and entering at their outer bent ends or noses up through center holes in the springs, corresponding to the usual center holes of other springs for the bolts which hold the leaves of the spring. The long arms of these hook-shaped bolts e, which are clearly shown in Fig. 2 of the drawings, pass up the sides of the springs nearest the "reach" and through a strip of wood, k, extending across the body on the inside of or above the sills l when the vehicle-body is a narrow one, as shown in Figs. 1, 2, and 3, or, when the body of the vehicle is a wide one and the springs have less rise, the long arms of said bolts are passed through a wider strip or piece of oak plank, k', Fig. 4, reaching from outside to outside of sills and buggy-body and suitably secured, the sills of the vehicle-body then coming outside of the center portions of the springs, which for different buggy-bodies may be bent to conform to a single standard.

Having thus described my invention, what I claim as new, and desire to secure by Letters Patent, is—

The combination, with the vehicle-body and its front and rear axles, of the side springs, G G, bowed laterally inward and constructed with an inwardly-curving central portion, g, thence diverging in straight lines outward and clipped to the head-block and rear axle, the bolts d d, and the central hook-shaped bolts, e e, arranged upon the exterior of the apex sides of the curved portions g g and engaging at their hook ends with said curved portions of the springs and uniting them with the frame-work of the body of the vehicle, substantially as and for the purposes specified.

JAMES F. THOMAS.

Witnesses:
SAMUEL MORROW,
CHAS. E. DOLL.